(12) United States Patent
Boyd et al.

(10) Patent No.: US 11,531,371 B2
(45) Date of Patent: Dec. 20, 2022

(54) HARNESS APPARATUS FOR HEAD-MOUNTED DISPLAY DEVICES

(71) Applicant: Boyd Entertainment Group, LLC, Tacoma, WA (US)

(72) Inventors: Adam Christopher Boyd, Tacoma, WA (US); Christian Peter Burrows, Ritzville, WA (US)

(73) Assignee: Boyd Entertainment Group, LLC, Tacoma, WA (US)

( * ) Notice: Subject to any disclaimer, the term of this patent is extended or adjusted under 35 U.S.C. 154(b) by 69 days.

(21) Appl. No.: 17/315,154

(22) Filed: May 7, 2021

(65) Prior Publication Data

US 2022/0357765 A1   Nov. 10, 2022

(51) Int. Cl.
G06F 1/16 (2006.01)

(52) U.S. Cl.
CPC .................................... G06F 1/163 (2013.01)

(58) Field of Classification Search
CPC ...................................................... G06F 1/163
See application file for complete search history.

(56) References Cited

U.S. PATENT DOCUMENTS

| | | | | |
|---|---|---|---|---|
| 9,529,200 | B2* | 12/2016 | Thurber | H04N 21/4126 |
| 9,778,467 | B1* | 10/2017 | White | G02B 27/0176 |
| 10,146,262 | B1* | 12/2018 | Magrath | G06F 3/0304 |
| 10,165,850 | B1* | 1/2019 | Pombo | A45F 5/021 |
| 10,502,363 | B2* | 12/2019 | Edwards | F16M 13/04 |
| 10,764,566 | B2* | 9/2020 | Sullivan | G06Q 20/321 |
| 2016/0370590 | A1* | 12/2016 | Fujishiro | G02B 27/0176 |
| 2018/0364491 | A1* | 12/2018 | Park | G02B 27/0172 |
| 2019/0369660 | A1* | 12/2019 | Wen | G06F 1/163 |
| 2020/0042035 | A1* | 2/2020 | Chen | G06F 3/011 |
| 2020/0050235 | A1* | 2/2020 | Yoon | G06F 1/163 |
| 2020/0288970 | A1* | 9/2020 | Jackson | A61B 3/022 |

(Continued)

OTHER PUBLICATIONS

HTC's wireless Vive Air headset outed by a premature award, published at https://arstechnica.com/gaming/2021/04/htcs-wireless-vive-air-headset-outed-by-a-premature-award/ (Downloaded on Apr. 20, 2021).

(Continued)

Primary Examiner — Nidhi Thaker
(74) Attorney, Agent, or Firm — Master Key IP, LLP; Justin G. Sanders

(57) ABSTRACT

A harness apparatus for use with a head-mounted display device is disclosed. In at least one embodiment, the apparatus provides a pair of display connector portions positioned on opposing left and right sides of the display device. A harness assembly provides at least one elongate primary head strap for engagement about a user's head, with opposing terminal ends of the at least one primary head strap being positioned proximal a left temple and a right temple, respectively, of the user's head, and providing a pair of strap connector portions configured for removable engagement with the pair of display connector portions. The harness assembly further provides a gasket extending between the strap connector portions and configured for being positionable in contact with a face of the user so as to be sandwiched between the display device and the user's face when the display device is engaged with the harness assembly.

16 Claims, 6 Drawing Sheets

(56) References Cited

U.S. PATENT DOCUMENTS

2020/0310488 A1* 10/2020 Lin .................... G02B 27/0176
2020/0397342 A1* 12/2020 Lympouridis ........ A61B 5/0816
2021/0216099 A1* 7/2021 Goodner ............ G02B 27/0176
2021/0303025 A1* 9/2021 Chi .................... G02B 27/0176

OTHER PUBLICATIONS

International Search Report and Written Opinion, PCT/US2022/027729, dated Jul. 25, 2022.

* cited by examiner

HARNESS APPARATUS FOR HEAD-MOUNTED DISPLAY DEVICES

BACKGROUND

The subject of this patent application relates generally to head-mounted display devices, and more particularly to a harness apparatus for head-mounted display devices configured for enabling fast and secure engagement and disengagement of said display devices.

Applicant(s) hereby incorporate herein by reference any and all patents and published patent applications cited or referred to in this application.

By way of background, virtual reality ("VR") and augmented reality ("AR") experiences are becoming increasingly popular—not just for entertainment purposes, but for other purposes as well, including education and business. Oftentimes, these experiences utilize a head-mounted display device consisting of a small screen or other type of display area positionable directly in front of the user's eyes, with the display device secured to the user's head via one or more straps (hereinafter referred to as a "harness" for simplicity purposes). Given the relative expense of the hardware and software involved, some businesses (such as arcades and amusement parks, for example) provide temporary use of display devices on a rental basis in order to make these experiences available to a wider market. However, the sharing of display devices can give rise to its own set of problems, particularly with respect to the transmission of germs from one user to the next, given that the display devices, along with their harnesses, must be put on and taken off by hand. Thoroughly cleaning each display device between uses can help combat those problems, but it also increases the costs for the business owners, which costs are typically passed along to users through increased rental fees. Accordingly, there remains a need for display devices that may be quickly and easily shared between users while reducing the risk of germ transmission therebetween.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a harness apparatus for use with a head-mounted display device and configured for removable engagement with a head of a user. In at least one embodiment, the apparatus provides a pair of display connector portions positioned on opposing left and right sides of the display device, along with a harness assembly. The harness assembly provides an at least one elongate primary head strap extending in a substantially horizontal plane for engagement about the user's head, with opposing terminal ends of the at least one primary head strap being positioned proximal a left temple and a right temple, respectively, of the user's head, along with a pair of strap connector portions configured for removable engagement with the pair of display connector portions, each of the strap connector portions engaged with a corresponding one of the terminal ends of the at least one primary head strap. The harness assembly further provides a gasket sized for approximating the dimensions of a perimeter edge of a housing of the display device, the gasket extending between the strap connector portions and configured for being positionable in contact with a face of the user so as to be sandwiched between the display device and the user's face when the display device is engaged with the harness assembly. With the gasket positioned in contact with the user's face, the primary head strap may be secured around the user's head, thereby maintaining the positioning of the gasket relative to the user's face, and allowing the display device to be quickly engaged and subsequently disengaged with the harness assembly via the corresponding display connector portions Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
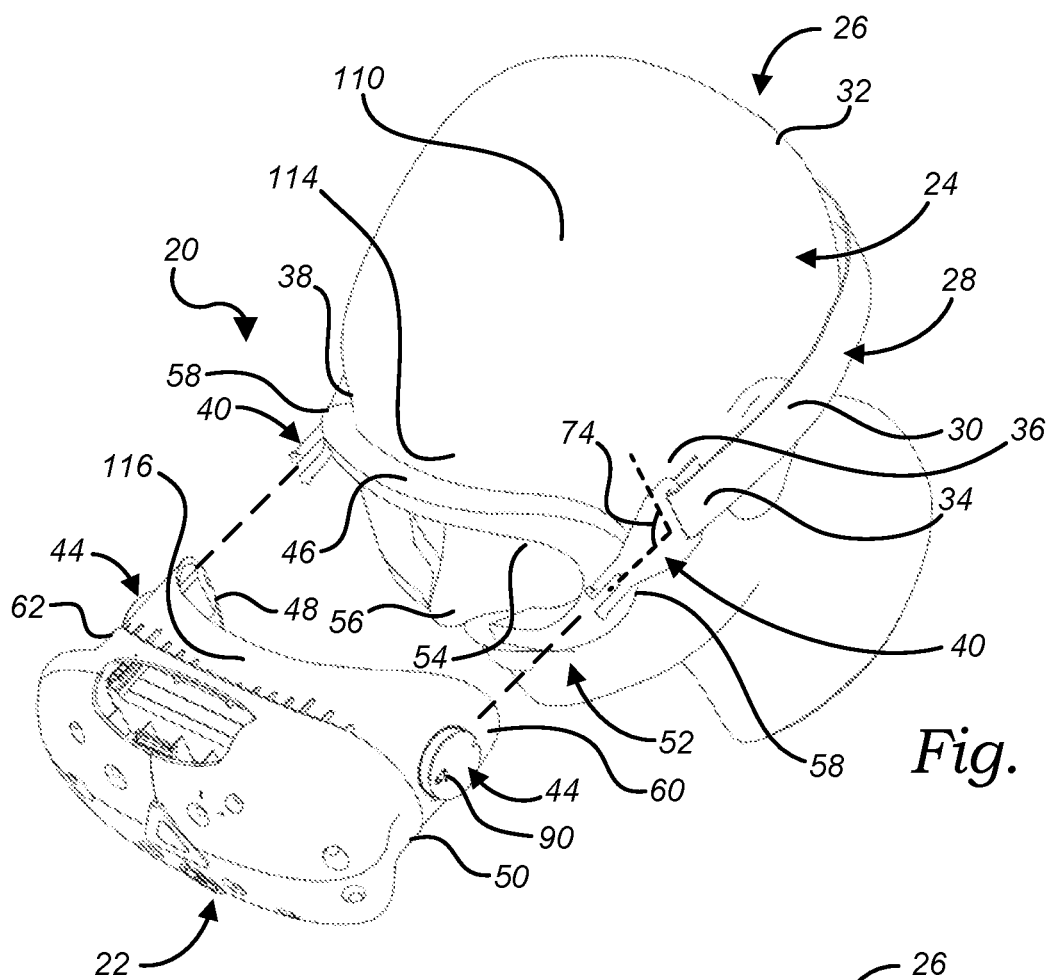
FIGS. 1 and 2 are perspective views of an exemplary harness apparatus along with an exemplary head-mounted display device, in accordance with at least one embodiment.
Figure 2:
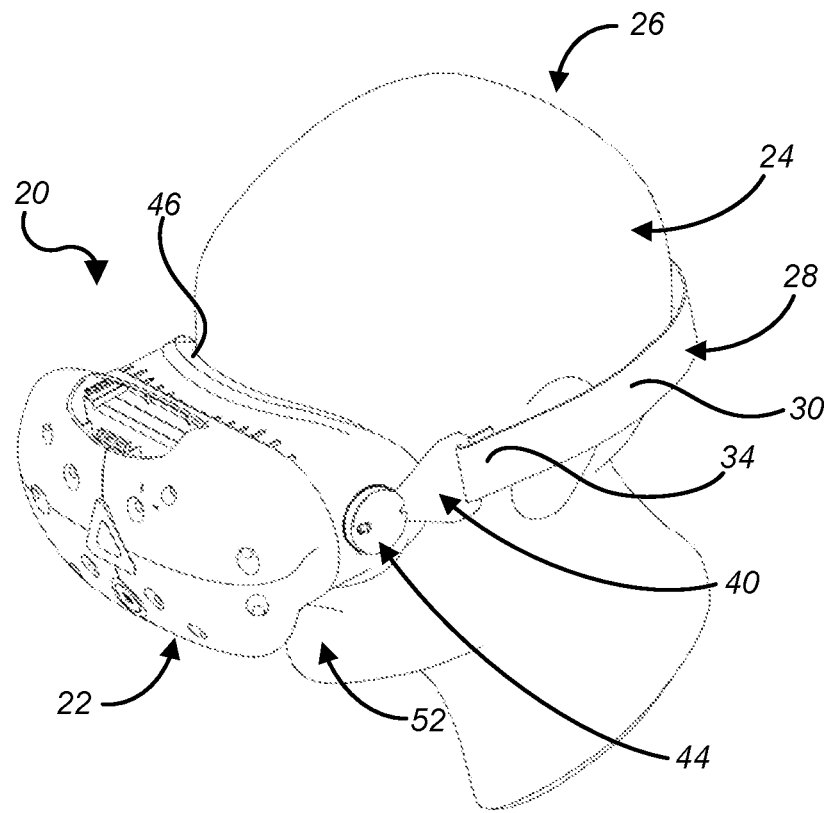

Turning now to FIGS. 1 and 2, there are shown perspective views of an exemplary harness apparatus 20 along with an exemplary head-mounted display device 22 for being removably engaged with a head 24 of a user 26, in accordance with at least one embodiment. At the outset, it should be noted that while certain types of display devices 22 are shown and described herein for illustrative purposes, in further embodiments, the apparatus 20 may be configured for use in conjunction with any other such display device now known or later developed—regardless of whether the display device is for VR content, AR content or any other forms of interactive visual or audiovisual content now known or later developed. Thus, the apparatus 20 should not be read as being limited to the specific exemplary display devices 22 shown and described herein.

With continued reference to FIGS. 1 and 2, in at least one embodiment, the apparatus 20 provides a harness assembly 28 that has an at least one elongate primary head strap 30 positioned and configured for extending in a substantially horizontal plane around a rear 32 of the user's head 24, with opposing terminal ends 34 of the primary head strap 30 being positioned proximal a left temple 36 and a right temple 38, respectively, of the user's head 24. In at least one embodiment, the primary head strap 30 is lengthwise adjustable for accommodating a range of head 24 circumferences. It should be noted that the size, shape, quantity and positioning of the at least one primary head strap 30 depicted in the drawings is merely exemplary. In further embodiments, the at least one primary head strap 30 may take on any other size, shape, quantity and/or positioning, now known or later developed, so long as the apparatus 20 is substantially able to carry out the functionality described herein.

In at least one embodiment, the harness assembly 28 further provides a pair of strap connector portions 40, with each of the strap connector portions 40 engaged with a corresponding one of the terminal ends 34 of the primary head strap 30. In at least one embodiment, each of the strap connector portions 40 provides a strap aperture 42 sized and configured for allowing the corresponding terminal end 34 of the primary head strap 30 to pass therethrough and be folded back onto itself and secured thereto (such as by stitching or other permanent or non-permanent attachment means, now known or later developed). In further embodiments, the terminal ends 34 of the primary head strap 30 may be permanently or non-permanently engaged with the respective strap connector portions 40 using any other mechanism or technique, now known or later developed. Each of the strap connector portions 40 is further configured for removable engagement with a corresponding display connector portion 44 positioned on the display device 22, as discussed in greater detail below. In at least one embodiment, as best illustrated in FIG. 1, the harness assembly 28 further provides a gasket 46 sized for approximating the dimensions of a perimeter edge 48 of a housing 50 of the display device 22, the gasket 46 configured for being positionable in contact with a face 52 of the user 26 so as to be sandwiched between the display device 22 and the user's face 52 when the display device 22 is engaged with the harness assembly 28, as discussed further below. The gasket 46 is further configured for leaving the eyes 54 and nose 56 of the user 26 substantially unobstructed when the apparatus 20 is engaged with the user's head 24. In at least one embodiment, the gasket 46 provides opposing lateral edges 58, with each of the strap connector portions 40 being mounted to a corresponding one of the lateral edges 58. In this way, during use of the apparatus 20, the gasket 46 may be positioned in contact with the user's face 52, and the primary head strap 30 may then be secured around the user's head 24, thereby maintaining the positioning of the gasket 46 relative to the user's face 52. In at least one alternate embodiment, each of the strap connector portions 40 may be mounted elsewhere on the gasket 46. In at least one further alternate embodiment, each of the terminal ends 34 of the primary head strap 30 is mounted to a corresponding one of the lateral edges 58 of the gasket 46 (or elsewhere on the gasket 46). In at least one embodiment, the gasket 46 is constructed out of one or more resilient materials, such as foam or rubber, for example. However, in further embodiments, the gasket 46 may be constructed out of any other material (or combination of materials), now known or later developed, so long as the apparatus 20 is substantially able to carry out the functionality described herein. It should also be noted that the size, shape, dimensions and positioning of the gasket 46 depicted in the drawings is merely exemplary. In further embodiments, the gasket 46 may take on any other sizes, shapes, dimensions and/or positioning, now known or later developed, so long as the apparatus 20 is substantially able to carry out the functionality described herein.

Figure 3:
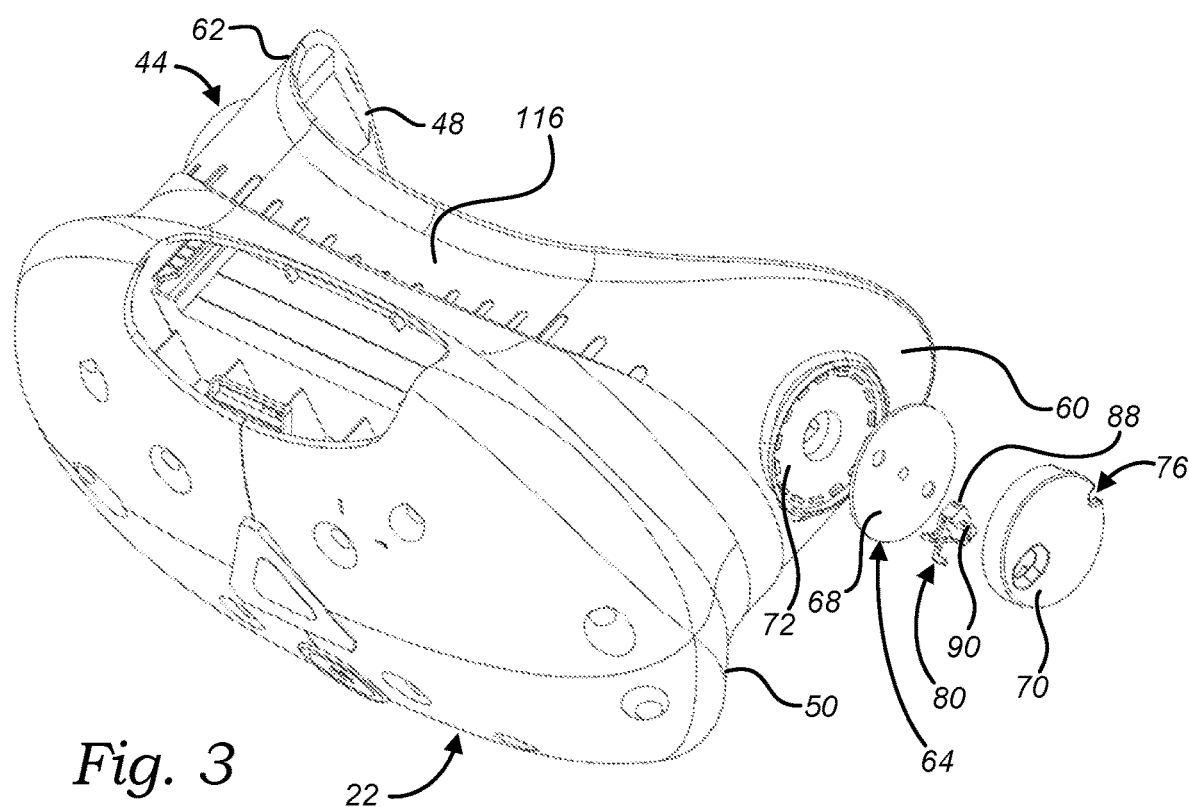
FIG. 3 is an exploded view of an exemplary display connector portion of the harness apparatus, in accordance with at least one embodiment.

In at least one embodiment, the apparatus 20 further provides a pair of display connector portions 44 positioned on opposing left and right sides 60 and 62 of the display device 22 and configured for removable engagement with the corresponding strap connector portions 40. In at least one such embodiment, as best illustrated in FIG. 3, each of the display connector portions 44 provides a connector plate 64. A bottom surface 66 of the connector plate 64 is configured for engagement with the corresponding left or right side 60 or 62 of the display device 22, while an opposing top surface 68 of the connector plate 64 provides a display connector mechanism 70. In at least one embodiment, the left and right sides 60 and 62 of the display device 22 each provides a mount location 72, such that the connector plates 64 are configured for mating or otherwise engaging with the mount locations 72. As such, the apparatus 20 is capable of utilizing connector plates 64 of various configurations so as to allow the apparatus 20 to be used in connection with any pre-existing display device 22, now known or later developed, including display devices 22 that utilize proprietary mount locations 72 designed to engage pre-existing harnesses. In at least one alternate embodiment, the connector plate 64 and the display connector mechanism 70 are a unitary piece, such that the bottom surface 66 of the connector plate 64 is in fact the bottom surface of the display connector mechanism 70. As such, in at least one embodiment, the terms "connector plate" and "display connector mechanism" are to be read as being one and the same component.

In at least one embodiment, as illustrated in FIG. 1, the engagement between each strap connector portion 40 and the corresponding display connector portion 44 (i.e., the angle at which each strap connector portion 40 is inserted into the corresponding display connector portion 44) is oriented at an engagement angle 74 that is between approximately 0 degrees and approximately 90 degrees relative to the user's face 52. In at least one such embodiment, the engagement angle 74 is approximately 90 degrees so as to allow the display device 22 to be engaged with the harness assembly 28 in a direction that is substantially perpendicular to the user's face 52, thereby making it relatively easier to engage the display device 22 with the harness assembly 28, while also increasing the stability of the engagement between the harness assembly 28 and the display device 22. In still further embodiments, other engagement angles 74 between 90 degrees and 360 degrees may be utilized.

Figure 4:
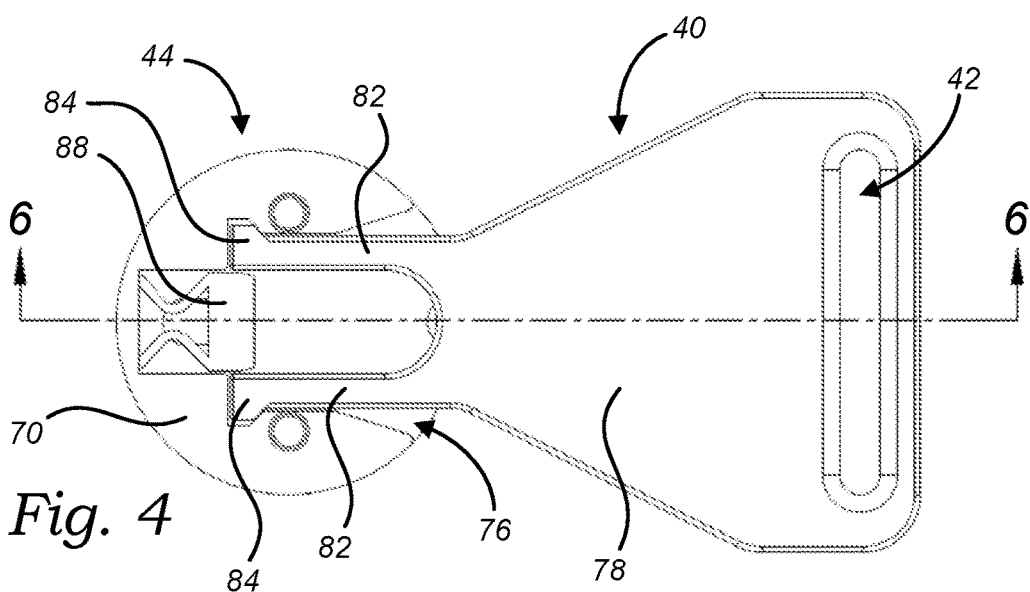
FIGS. 4 and 5 are perspective views of an exemplary strap connector portion of the harness apparatus engaged with a cutaway view of an exemplary display connector portion, in accordance with at least one embodiment.
Figure 5:
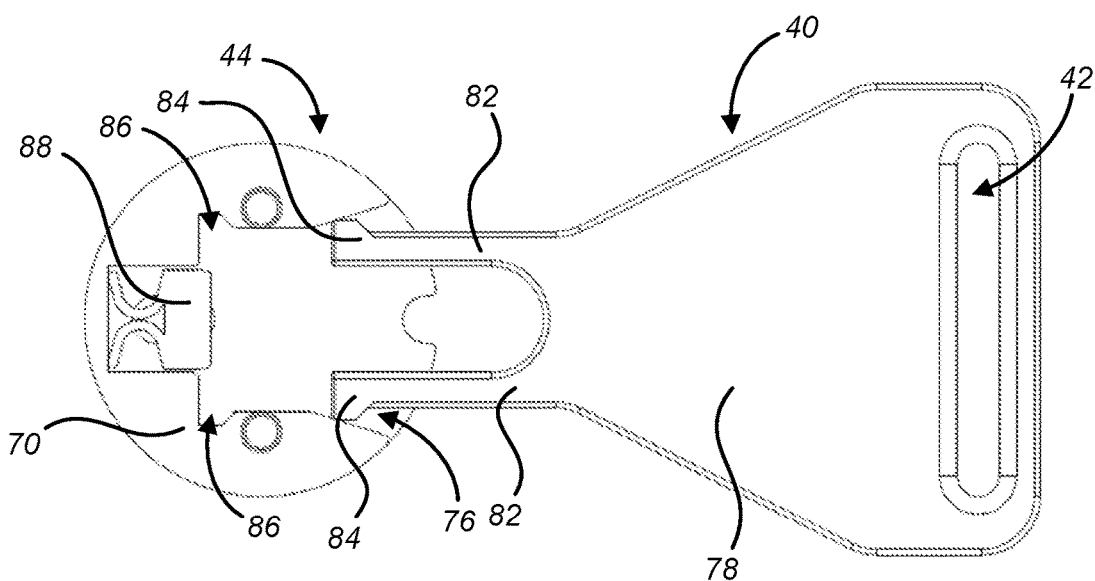
Figure 6:
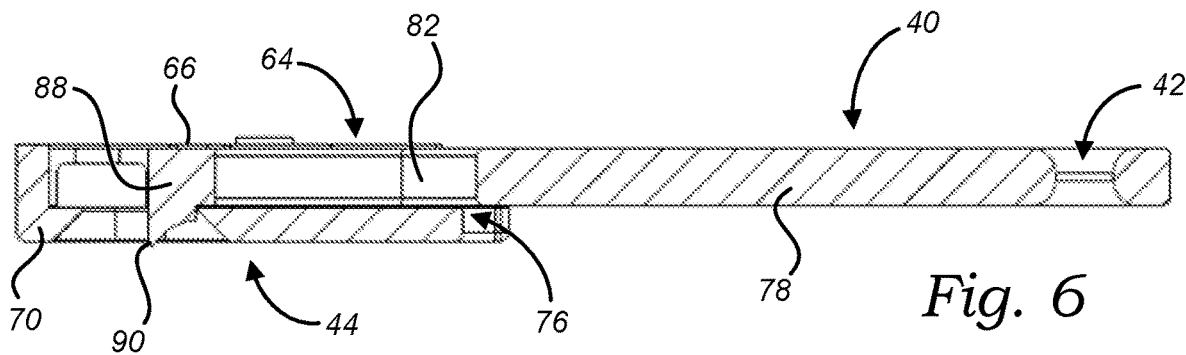
FIG. 6 is a cross-sectional view taken along line 6-6 of FIG. 4.

In at least one embodiment, as best illustrated in FIGS. 4-6, the display connector mechanism 70 provides a slot 76 configured for selectively receiving a corresponding strap connector mechanism 78 provided by the corresponding strap connector portion 40. Additionally, in at least one embodiment, the display connector mechanism 70 provides a lock 80 configured for preventing the strap connector mechanism 78 from becoming unintentionally disengaged from the display connector mechanism 70. In at least one such embodiment, the strap connector mechanism 78 provides a pair of spaced apart connector tabs 82 configured for selectively flexing inwardly toward one another as the connector tabs 82 are inserted into the slot 76 of the display connector mechanism 70. Additionally, in at least one such embodiment, a terminal end 84 of each connector tab 82 is configured for indexing into a corresponding connector notch 86 positioned within the slot 76 of the display connector mechanism 70. FIG. 4 illustrates the strap connector mechanism 78 in an engaged state relative to the display connector mechanism 70, while FIG. 5 illustrates the strap connector mechanism 78 in a disengaged state relative to the display connector mechanism 70. In at least one embodiment, the lock 76 of the display connector mechanism 70 is a stop block 88 slidably positioned within the slot 76 and configured for selectively moving between one of a locked position (FIG. 4)—wherein the stop block 88 is moved into a position substantially between the connector tabs 82, when the strap connector mechanism 78 is in the engaged state, so as to physically prevent the connector tabs 82 from flexing inwardly toward each other which, in turn, prevents the terminal ends 84 of the connector tabs 82 from moving out of the corresponding connector notches 86, thereby preventing the strap connector mechanism 78 from moving into the disengaged state relative to the display connector mechanism 70—and an unlocked position (FIG. 5)—wherein the stop block 88 is moved into a position that no longer prevents the connector tabs 82 from flexing inwardly toward each other which, in turn, allows the terminal ends 84 of the connector tabs 82 to selectively move out of the corresponding connector notches 86, thereby allowing the strap connector mechanism 78 to selectively move into the disengaged state relative to the display connector mechanism 70. Thus, in such embodiments, the stop block 88 is configured for selectively locking the strap connector mechanism 78 in the engaged state relative to the display connector mechanism 70, thereby preventing the display device 22 from becoming unintentionally disengaged from the harness assembly 28 during use of the apparatus 20.

In at least one embodiment, as best illustrated in FIGS. 3 and 6, the stop block 88 provides a block tab 90 that is externally accessible through the display connector mechanism 70 for manually moving the stop block 88 between the locked position and unlocked position. Additionally, in at least one embodiment, the stop block 88 is mechanically biased into the locked position, such that as the connector tabs 82 are inserted into the slot 76, the terminal ends 84 of the connector tabs 82 push the stop block 88 into the unlocked position until the terminal ends 84 index into the corresponding connector notches 86, at which point the stop block 88 automatically moves back into the locked position.

Figure 7:
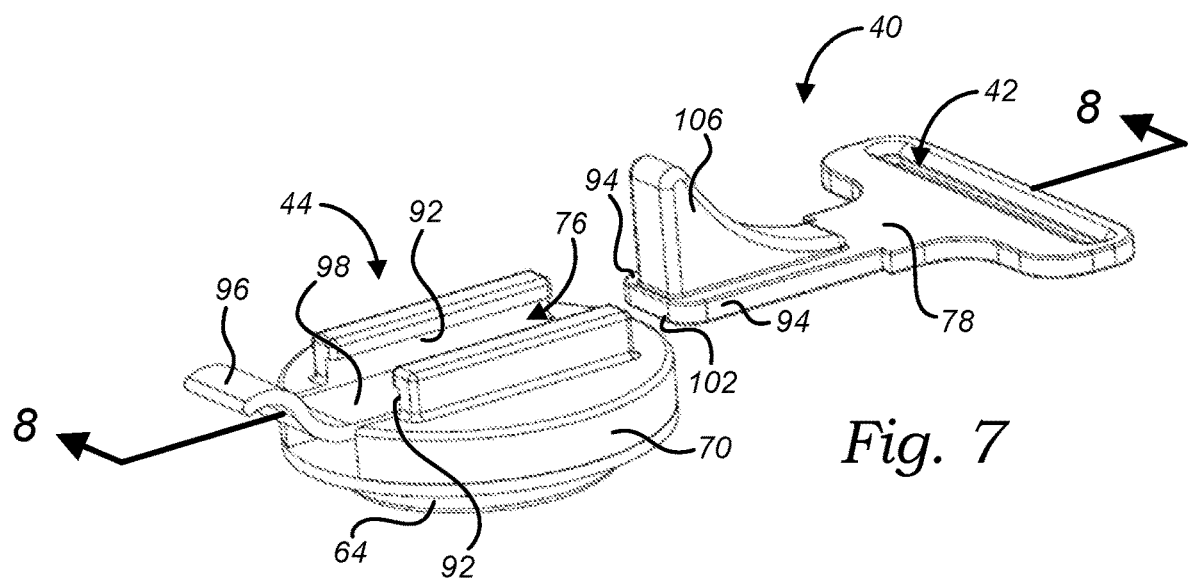
FIG. 7 is a perspective view of a further exemplary strap connector portion and corresponding display connector portion of the harness apparatus in a disengaged state, in accordance with at least one embodiment.
Figure 8:
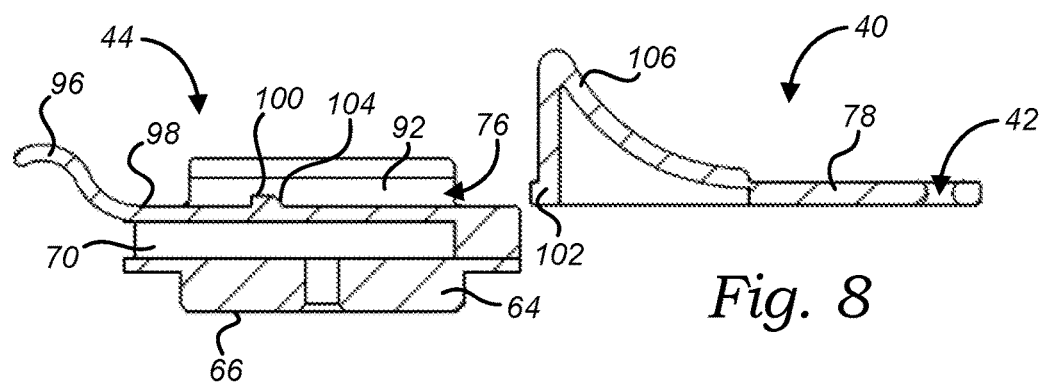
FIG. 8 is a cross-sectional view taken along line 8-8 of FIG. 7.
Figure 9:
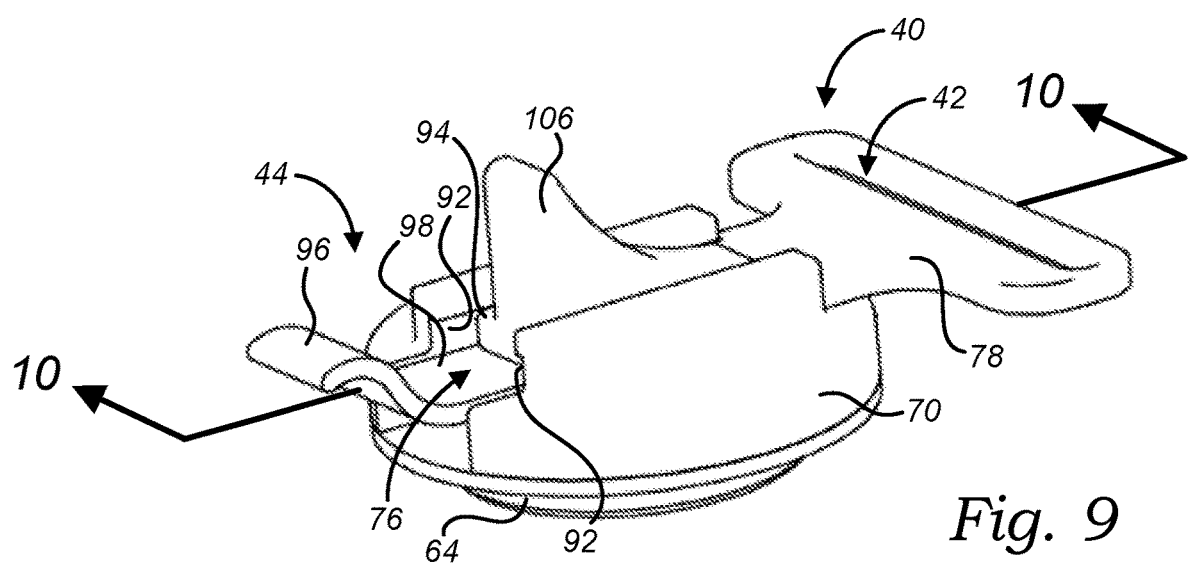
FIG. 9 is a further perspective view of the strap connector portion and corresponding display connector portion of FIG. 7 in an engaged state, in accordance with at least one embodiment.
Figure 10:
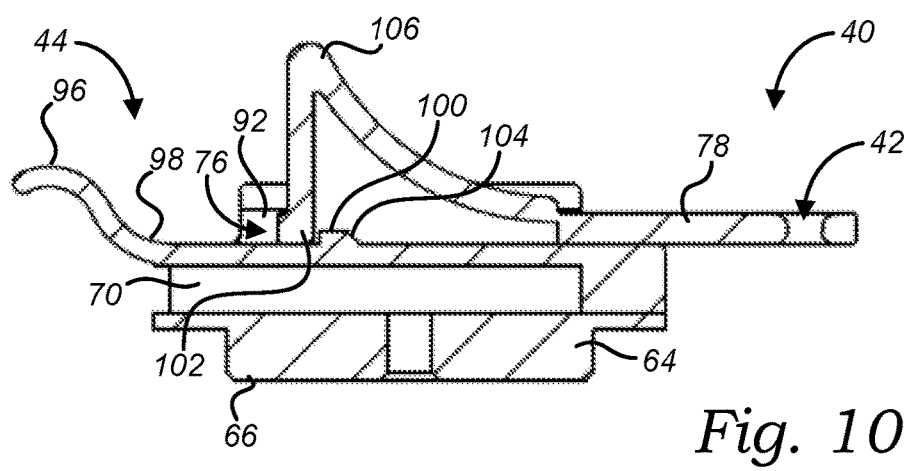
FIG. 10 is a cross-sectional view taken along line 10-10 of FIG. 8.

In at least one alternate embodiment, as best illustrated in FIGS. 7-10, the slot 76 of the display connector mechanism 70 defines laterally opposing tracks 92, while the strap connector mechanism 78 provides corresponding laterally opposing side rails 94 sized and configured for riding within the tracks 92 when the strap connector mechanism 78 is inserted into the slot 76. FIG. 7 illustrates the strap connector mechanism 78 in a disengaged state relative to the display connector mechanism 70, while FIG. 9 illustrates the strap connector mechanism 78 in an engaged state relative to the display connector mechanism 70. In at least one such embodiment, the lock 80 of the display connector mechanism 70 is a mechanically biased tongue 96 (such as a flat spring, for example), with an upper surface 98 of the tongue 96 providing a catch 100 positioned and configured for hooking onto a downwardly extending lip 102 of the strap connector mechanism 78. In such embodiments, the tongue 96 is configured for selectively moving between one of a locked position (FIGS. 9 and 10)—wherein the catch 100 of the tongue 96 is hooked onto the lip 102 of the strap connector mechanism 78, when the strap connector mechanism 78 is in the engaged state, so as to physically prevent the strap connector mechanism 78 from being removed from the slot 76, thereby preventing the strap connector mechanism 78 from moving into the disengaged state relative to the display connector mechanism 70—and an unlocked position (FIGS. 7 and 8)—wherein the tongue 96 is manually pressed so as to temporarily flex and move the catch 100 away from the lip 102 of the strap connector mechanism 78 which, in turn, allows the strap connector mechanism 78 to be removed from the slot 76, thereby allowing the strap connector mechanism 78 to selectively move into the disengaged state relative to the display connector mechanism 70. Thus, in such embodiments, the tongue 96 is configured for selectively locking the strap connector mechanism 78 in the engaged state relative to the display connector mechanism 70, thereby preventing the display device 22 from becoming unintentionally disengaged from the harness assembly 28 during use of the apparatus 20. Additionally, in at least one such embodiment, the tongue 96 is mechanically biased into the locked position, with a leading edge 104 of the catch 100 being angled away from the lip 102 of the strap connector mechanism 78, such that as the strap connector mechanism 78 is inserted into the slot 76, the lip 102 of the strap connector mechanism 78 slides along the leading edge 104 of the catch 100 and causes the tongue 96 to flex downwardly until the lip 102 passes completely over the catch 100, at which point the tongue 96 automatically moves back into the locked position and causes the catch 100 to hook onto the lip 102. In at least one embodiment, the strap connector mechanism 78 provides a thumb tab 106 for assisting with manually moving the strap connector mechanism 78 between the engaged state and disengaged state.

It should be noted that in at least one alternate embodiment, the above-described components associated with each of the strap connector mechanism 78 and display connector mechanism 70 may be swapped—i.e., the components described above as being provided by the strap connector mechanism 78 may instead be provided by the display connector mechanism 70, while the components described above as being provided by the display connector mechanism 70 may instead be provided by the strap connector mechanism 78. Thus, the apparatus 20 should not be read as being limited to only the above-described embodiments. Furthermore, in still further alternate embodiments, any other mechanisms or technologies—now known or later developed—capable of creating a removable engagement between the strap connector portions 40 and corresponding display connector portions 44 may be substituted without departing from the spirit or scope of the present invention, so long as the apparatus 20 is substantially able to carry out the functionality described herein.

Figure 11:
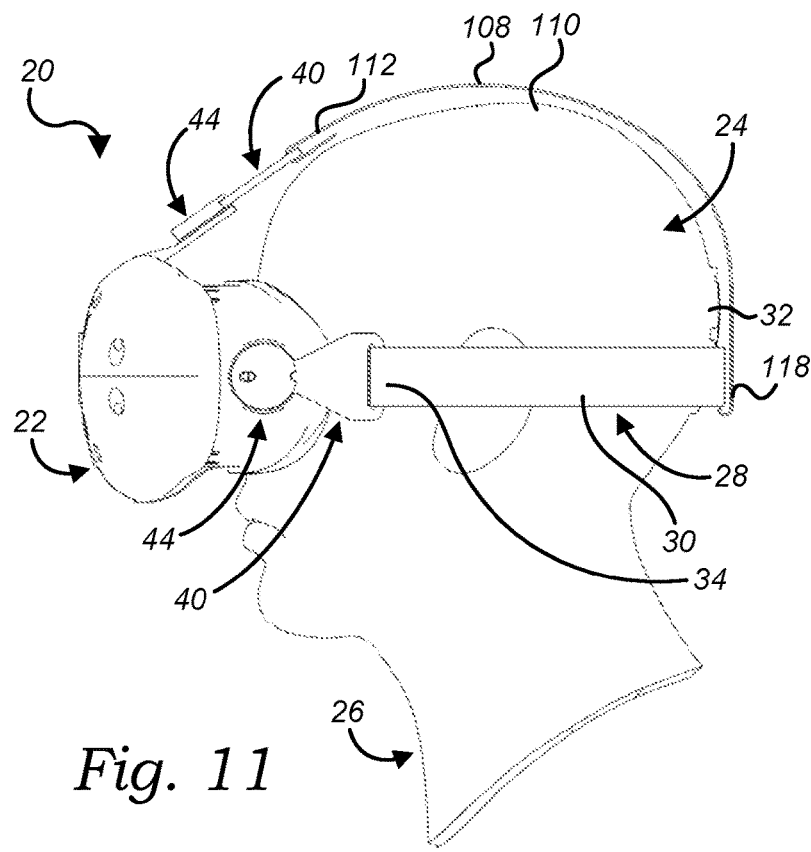
FIG. 11 is a side elevational view of a further exemplary harness apparatus along with an exemplary head-mounted display device, in accordance with at least one embodiment.
Figure 12:
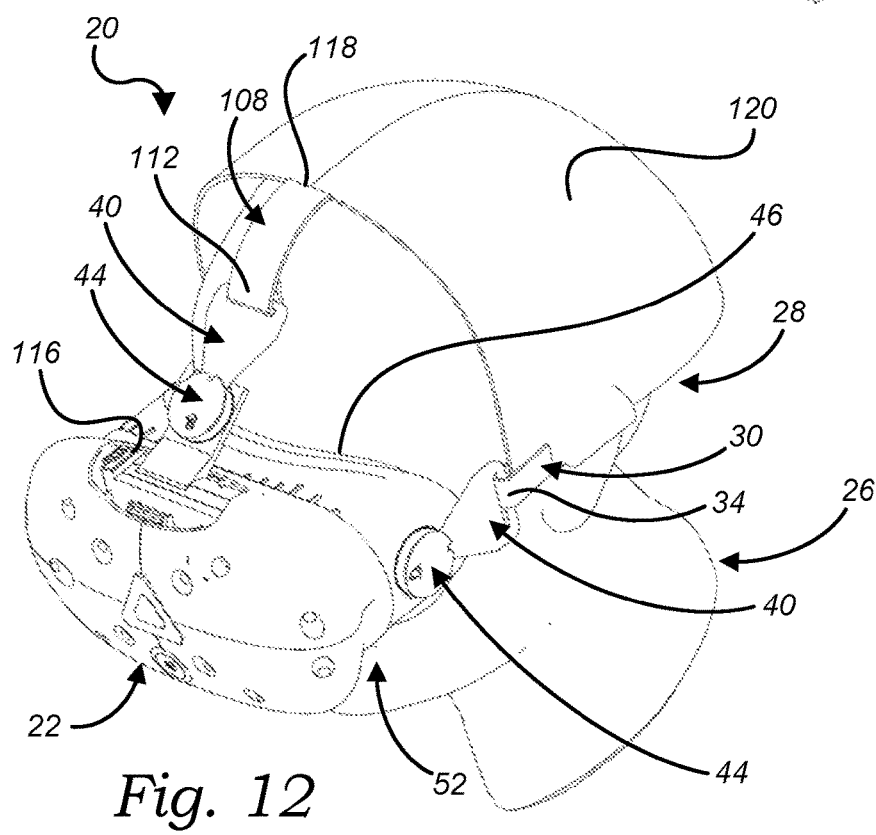
FIG. 12 is a perspective view of a still further exemplary harness apparatus along with an exemplary head-mounted display device, in accordance with at least one embodiment.

In at least one embodiment, as illustrated in FIGS. 11 and 12, the harness assembly 28 further provides an at least one elongate secondary head strap 108 positioned and configured for extending in a substantially vertical plane over a top 110 of the user's head 24, with a terminal end 112 of the secondary head strap 108 being positioned proximal a forehead 114 of the user 26. Similar to the at least one primary head strap 30, the terminal end 112 of the at least one secondary head strap 108 provides a strap connector portion 40 configured for removable engagement with a corresponding display connector portion 44 positioned on or otherwise connected to a top surface 116 of the display device 22. Thus, the at least one secondary head strap 108 is configured for providing additional stability between the harness assembly 28 and the display device 22. In at least one embodiment, the secondary head strap 108 is lengthwise adjustable for accommodating a range of head 24 circumferences. In at least one embodiment, an opposing end 118 of the at least one secondary head strap 108 is engaged with the at least one primary head strap 30, at a location proximal the rear 32 of the user's head 24. In at least one alternate embodiment, as illustrated in FIG. 12, the harness assembly 28 provides a headpiece 120 sized and configured for being removably engaged with the user's head 24, with each of the at least one primary head strap 30 and at least one secondary head strap 108 being engaged with the headpiece 120 and configured for cooperating to securely engage the harness assembly 28 with the user's head 24. Thus, in at least one such embodiment, rather than the at least one primary head strap 30 itself extending around the rear 32 of the user's head 24, the at least one primary head strap 30 instead cooperates with the headpiece 120 to extend around the rear 32 of the user's head 24. Additionally, in at least one such embodiment, rather than the opposing end 118 of the at least one secondary head strap 108 being engaged with the at least one primary head strap 30, the opposing end 118 is instead engaged with the headpiece 120. It should be noted that the size, shape, quantity and positioning of the at least one secondary head strap 108 depicted in the drawings is merely exemplary. In further embodiments, the at least one secondary head strap 108 may take on any other size, shape, quantity and/or positioning, now known or later developed, so long as the apparatus 20 is substantially able to carry out the functionality described herein. Similarly, the size, shape, dimensions and positioning of the headpiece 120 depicted in the drawings is merely exemplary. In further embodiments, the headpiece 120 may take on any other sizes, shapes, dimensions and/or positioning, now known or later developed, so long as the apparatus 20 is substantially able to carry out the functionality described herein.

In at least one alternate embodiment (not shown), the at least one primary head strap 30 may be omitted, such that the pair of strap connector portions 40 are engaged directly with the headpiece 120 proximal the left temple 36 and right temple 38, respectively, of the user's head 24. In at least one such embodiment, the gasket 46 is also engaged directly with the headpiece 120. In at least one still further alternate embodiment (also not shown), the strap connector portions 40 positioned proximal the left temple 36 and right temple 38 of the user's head 24 are omitted, such that only the at least one strap connector portion 40 positioned proximal the user's forehead 114 remains—with said at least one strap connector portion 40 being engaged either directly with the headpiece 120, or alternatively with the at least one secondary head strap 108.

In at least one embodiment, the configuration of each display connector mechanism 70 and the corresponding strap connector mechanism 78 is universal across multiple instances of the apparatus 20 (while the connector plates 64 are configured to engage the specific display device 22 to be utilized by the user 26). In this way, a business which owns a plurality of display devices 22 may have the display connector portions 44 pre-installed on each of its display devices 22 (regardless of the make or model of each display device 22), such that it may then allow users 26 to bring their own instances of the harness assembly 28 without worry of whether the harness assembly 28 will be compatible with any of the display devices 22 (given the universal nature of the display connector mechanism 70 and strap connector mechanism 78). Furthermore, in light of the position and configuration of the strap connector portions 40 and corresponding display connector portions 44 (including the engagement angle 74), as discussed above, any given display device 22 may be quickly and easily engaged and subsequently disengaged from a user's harness assembly 28 by an employee of the business, in a "click-in, click-out" fashion, without the employee ever needing to physically touch the user's harness assembly 28. Similarly, the user 26 would never need to physically touch the display device 22, thereby reducing the likelihood of germ transmission between the display device 22 and the harness assembly 28 and, in turn, the likelihood of germ transition from one user 26 of a given display device 22 to the next.

Aspects of the present specification may also be described as the following embodiments:

1. A harness apparatus for use with a head-mounted display device and configured for removable engagement with a head of a user, the apparatus comprising: a pair of display connector portions positioned on opposing left and right sides of the display device; and a harness assembly comprising: an at least one elongate primary head strap extending in a substantially horizontal plane for engagement about the user's head, with opposing terminal ends of the at least one primary head strap being positioned proximal a left temple and a right temple, respectively, of the user's head; a pair of strap connector portions configured for removable engagement with the pair of display connector portions, each of the strap connector portions engaged with a corresponding one of the terminal ends of the at least one primary head strap; and a gasket sized for approximating the dimensions of a perimeter edge of a housing of the display device, the gasket extending between the strap connector portions and configured for being positionable in contact with a face of the user so as to be sandwiched between the display device and the user's face when the display device is engaged with the harness assembly; whereby, with the gasket positioned in contact with the user's face, the primary head strap may be secured around the user's head, thereby maintaining the positioning of the gasket relative to the user's face, and allowing the display device to be quickly engaged and subsequently disengaged with the harness assembly via the corresponding display connector portions.

2. The harness apparatus according to embodiment 1, wherein the at least one primary head strap is positioned and configured for extending around a rear of the user's head.

3. The harness apparatus according to embodiments 1-2, wherein the at least one primary head strap is lengthwise adjustable.

4. The harness apparatus according to embodiments 1-3, wherein each of the strap connector portions provides a strap aperture sized and configured for allowing the corresponding terminal end of the at least one primary head strap to pass therethrough.

5. The harness apparatus according to embodiments 1-4, wherein the strap connector portions are mounted to opposing lateral edges of the gasket.

6. The harness apparatus according to embodiments 1-5, wherein the terminal ends of the at least one primary head strap are mounted to opposing lateral edges of the gasket.

7. The harness apparatus according to embodiments 1-6, wherein the gasket is constructed out of one or more resilient materials.

8. The harness apparatus according to embodiments 1-7, wherein: each of the display connector portions provides a connector plate; a bottom surface of the connector plate configured for engagement with a mount location on the corresponding left or right side of the display device; and an opposing top surface of the connector plate providing a display connector mechanism configured for removable engagement with a strap connector mechanism provided by the corresponding strap connector portion.

9. The harness apparatus according to embodiments 1-8, wherein engagement between each strap connector mechanism and the corresponding display connector mechanism is oriented at an engagement angle that is between approximately 0 degrees and approximately 90 degrees relative to the user's face.

10. The harness apparatus according to embodiments 1-9, wherein the engagement angle is approximately 90 degrees relative to the user's face.

11. The harness apparatus according to embodiments 1-10, wherein each display connector mechanism provides a slot configured for selectively receiving the corresponding strap connector mechanism provided by the corresponding strap connector portion.

12. The harness apparatus according to embodiments 1-11, wherein each display connector mechanism provides a lock configured for selectively preventing the strap connector mechanism from becoming unintentionally disengaged from the display connector mechanism.

13. The harness apparatus according to embodiments 1-12, wherein: each strap connector mechanism provides a pair of spaced apart connector tabs configured for selectively flexing inwardly toward one another as the connector tabs are inserted into the slot of the corresponding display connector mechanism; and a terminal end of each connector tab is configured for indexing into a corresponding connector notch positioned within the slot of the display connector mechanism; whereby, each strap connector mechanism is configured for moving between one of an engaged state—wherein the terminal ends of the connector tabs are indexed into the corresponding connector notches—and a disengaged state—wherein the terminal ends of the connector tabs are moved out of the corresponding connector notches, thereby allowing the strap connector mechanism to be disengaged from the display connector mechanism.

14. The harness apparatus according to embodiments 1-13, wherein the lock of the display connector mechanism is a stop block slidably positioned within the slot and configured for selectively moving between one of a locked position—wherein the stop block is moved into a position substantially between the connector tabs, when the strap connector mechanism is in the engaged state, so as to physically prevent the connector tabs from flexing inwardly toward each other which, in turn, prevents the terminal ends of the connector tabs from moving out of the corresponding connector notches—and an unlocked position—wherein the stop block is moved into a position that no longer prevents the connector tabs from flexing inwardly toward each other which, in turn, allows the terminal ends of the connector tabs to selectively move out of the corresponding connector notches.

15. The harness apparatus according to embodiments 1-14, wherein the stop block provides a block tab that is externally accessible through the display connector mechanism for manually moving the stop block between the locked position and unlocked position.

16. The harness apparatus according to embodiments 1-15, wherein the stop block is mechanically biased into the locked position, such that as the connector tabs are inserted into the slot, the terminal ends of the connector tabs push the stop block into the unlocked position until the terminal ends index into the corresponding connector notches, at which point, the stop block automatically moves back into the locked position.

17. The harness apparatus according to embodiments 1-16, wherein: the slot of each display connector mechanism defines laterally opposing tracks; each strap connector mechanism provides corresponding laterally opposing side rails sized and configured for riding within the tracks of the corresponding display connector mechanism when the strap connector mechanism is inserted into the slot; the lock of each display connector mechanism is a mechanically biased tongue, with an upper surface of the tongue providing a catch positioned and configured for hooking onto a downwardly extending lip of the strap connector mechanism; whereby, each strap connector mechanism is configured for moving between one of an engaged state—wherein the catch of the tongue is hooked onto the lip of the strap connector mechanism—and a disengaged state—wherein the tongue is manually pressed so as to temporarily flex and move the catch away from the lip of the strap connector mechanism which, in turn, allows the strap connector mechanism to be disengaged from the display connector mechanism.

18. The harness apparatus according to embodiments 1-17, wherein the tongue is mechanically biased into the locked position, with a leading edge of the catch being angled away from the lip of the strap connector mechanism, such that as the strap connector mechanism is inserted into the slot, the lip of the strap connector mechanism slides along the leading edge of the catch and causes the tongue to flex downwardly until the lip passes completely over the catch, at which point the tongue automatically moves back into the locked position and causes the catch to hook onto the lip.

19. The harness apparatus according to embodiments 1-18, wherein each strap connector mechanism provides a thumb tab for assisting with manually moving the strap connector mechanism between the engaged state and disengaged state.

20. The harness apparatus according to embodiments 1-19, further comprising: an at least one further display connector portion positioned on a top surface of the display device; and the harness assembly further comprising: an at least one elongate secondary head strap positioned and configured for extending in a substantially vertical plane over a top of the user's head, with a terminal end of the secondary head strap being positioned proximal a forehead of the user; and an at least one strap connector portion configured for removable engagement with the at least one further display connector portion, each of the at least one strap connector portion engaged with a corresponding one of the terminal ends of the at least one secondary head strap.

21. The harness apparatus according to embodiments 1-20, wherein the at least one secondary head strap is lengthwise adjustable.

22. The harness apparatus according to embodiments 1-21, wherein an opposing end of the at least one secondary head strap is engaged with the at least one primary head strap, at a location proximal a rear of the user's head.

23. The harness apparatus according to embodiments 1-22, wherein the harness assembly further comprises a headpiece sized and configured for being removably engaged with the user's head, with each of the at least one primary head strap and at least one secondary head strap being engaged with the headpiece and configured for cooperating to securely engage the harness assembly with the user's head.

24. The harness apparatus according to embodiments 1-23, wherein the at least one primary head strap cooperates with the headpiece to extend around the rear of the user's head.

25. The harness apparatus according to embodiments 1-24, wherein an opposing end of the at least one secondary head strap is engaged with the headpiece.

26. A harness apparatus for use with a head-mounted display device and configured for removable engagement with a head of a user, the apparatus comprising: a pair of display connector portions positioned on opposing left and right sides of the display device; and a harness assembly comprising: an at least one elongate primary head strap extending in a substantially horizontal plane for engagement about the user's head, with opposing terminal ends of the at least one primary head strap being positioned proximal a left temple and a right temple, respectively, of the user's head; a pair of strap connector portions configured for removable engagement with the pair of display connector portions, each of the strap connector portions engaged with a corresponding one of the terminal ends of the at least one primary head strap, wherein engagement between each strap connector portion and the corresponding display connector portion is oriented at an engagement angle that is between approximately 0 degrees and approximately 90 degrees relative to the user's face; and a gasket sized for approximating the dimensions of a perimeter edge of a housing of the display device, the gasket extending between the strap connector portions and configured for being positionable in contact with a face of the user so as to be sandwiched between the display device and the user's face when the display device is engaged with the harness assembly; whereby, with the gasket positioned in contact with the user's face, the primary head strap may be secured around the user's head, thereby maintaining the positioning of the gasket relative to the user's face, and allowing the display device to be quickly engaged and subsequently disengaged with the harness assembly via the corresponding display connector portions.

27. A combination harness apparatus and head-mounted display device configured for removable engagement with a head of a user, the apparatus comprising: a head-mounted display device; a pair of display connector portions positioned on opposing left and right sides of the display device; and a harness assembly comprising: an at least one elongate primary head strap extending in a substantially horizontal plane for engagement about the user's head, with opposing terminal ends of the at least one primary head strap being positioned proximal a left temple and a right temple, respectively, of the user's head; a pair of strap connector portions configured for removable engagement with the pair of display connector portions, each of the strap connector portions engaged with a corresponding one of the terminal ends of the at least one primary head strap; and a gasket sized for approximating the dimensions of a perimeter edge of a housing of the display device, the gasket extending between the strap connector portions and configured for being positionable in contact with a face of the user so as to be sandwiched between the display device and the user's face when the display device is engaged with the harness assembly; whereby, with the gasket positioned in contact with the user's face, the primary head strap may be secured around the user's head, thereby maintaining the positioning of the gasket relative to the user's face, and allowing the display device to be quickly engaged and subsequently disengaged with the harness assembly via the corresponding display connector portions.

28. The combination harness apparatus and head-mounted display device according to embodiment 27, wherein the at least one primary head strap is positioned and configured for extending around a rear of the user's head.

29. The combination harness apparatus and head-mounted display device according to embodiments 27-28, wherein the at least one primary head strap is lengthwise adjustable.

30. The combination harness apparatus and head-mounted display device according to embodiments 27-29, wherein each of the strap connector portions provides a strap aperture sized and configured for allowing the corresponding terminal end of the at least one primary head strap to pass therethrough.

31. The combination harness apparatus and head-mounted display device according to embodiments 27-30, wherein the strap connector portions are mounted to opposing lateral edges of the gasket.

32. The combination harness apparatus and head-mounted display device according to embodiments 27-31, wherein the terminal ends of the at least one primary head strap are mounted to opposing lateral edges of the gasket.

33. The combination harness apparatus and head-mounted display device according to embodiments 27-32, wherein the gasket is constructed out of one or more resilient materials.

34. The combination harness apparatus and head-mounted display device according to embodiments 27-33, wherein: each of the display connector portions provides a connector plate; a bottom surface of the connector plate configured for engagement with a mount location on the corresponding left or right side of the display device; and an opposing top surface of the connector plate providing a display connector mechanism configured for removable engagement with a strap connector mechanism provided by the corresponding strap connector portion.

35. The combination harness apparatus and head-mounted display device according to embodiments 27-34, wherein engagement between each strap connector mechanism and the corresponding display connector mechanism is oriented at an engagement angle that is between approximately 0 degrees and approximately 90 degrees relative to the user's face.

36. The combination harness apparatus and head-mounted display device according to embodiments 27-35, wherein the engagement angle is approximately 90 degrees relative to the user's face.

37. The combination harness apparatus and head-mounted display device according to embodiments 27-36, wherein each display connector mechanism provides a slot configured for selectively receiving the corresponding strap connector mechanism provided by the corresponding strap connector portion.

38. The combination harness apparatus and head-mounted display device according to embodiments 27-37, wherein each display connector mechanism provides a lock configured for selectively preventing the strap connector mechanism from becoming unintentionally disengaged from the display connector mechanism.

39. The combination harness apparatus and head-mounted display device according to embodiments 27-38, wherein: each strap connector mechanism provides a pair of spaced apart connector tabs configured for selectively flexing inwardly toward one another as the connector tabs are inserted into the slot of the corresponding display connector mechanism; and a terminal end of each connector tab is configured for indexing into a corresponding connector notch positioned within the slot of the display connector mechanism; whereby, each strap connector mechanism is configured for moving between one of an engaged state—wherein the terminal ends of the connector tabs are indexed into the corresponding connector notches—and a disengaged state—wherein the terminal ends of the connector tabs are moved out of the corresponding connector notches, thereby allowing the strap connector mechanism to be disengaged from the display connector mechanism.

40. The combination harness apparatus and head-mounted display device according to embodiments 27-39, wherein the lock of the display connector mechanism is a stop block slidably positioned within the slot and configured for selectively moving between one of a locked position—wherein the stop block is moved into a position substantially between the connector tabs, when the strap connector mechanism is in the engaged state, so as to physically prevent the connector tabs from flexing inwardly toward each other which, in turn, prevents the terminal ends of the connector tabs from moving out of the corresponding connector notches—and an unlocked position—wherein the stop block is moved into a position that no longer prevents the connector tabs from flexing inwardly toward each other which, in turn, allows the terminal ends of the connector tabs to selectively move out of the corresponding connector notches.

41. The combination harness apparatus and head-mounted display device according to embodiments 27-40, wherein the stop block provides a block tab that is externally accessible through the display connector mechanism for manually moving the stop block between the locked position and unlocked position.

42. The combination harness apparatus and head-mounted display device according to embodiments 27-41, wherein the stop block is mechanically biased into the locked position, such that as the connector tabs are inserted into the slot, the terminal ends of the connector tabs push the stop block into the unlocked position until the terminal ends index into the corresponding connector notches, at which point, the stop block automatically moves back into the locked position.

43. The combination harness apparatus and head-mounted display device according to embodiments 27-42, wherein: the slot of each display connector mechanism defines laterally opposing tracks; each strap connector mechanism provides corresponding laterally opposing side rails sized and configured for riding within the tracks of the corresponding display connector mechanism when the strap connector mechanism is inserted into the slot; the lock of each display connector mechanism is a mechanically biased tongue, with an upper surface of the tongue providing a catch positioned and configured for hooking onto a downwardly extending lip of the strap connector mechanism; whereby, each strap connector mechanism is configured for moving between one of an engaged state—wherein the catch of the tongue is hooked onto the lip of the strap connector mechanism—and a disengaged state—wherein the tongue is manually pressed so as to temporarily flex and move the catch away from the lip of the strap connector mechanism which, in turn, allows the strap connector mechanism to be disengaged from the display connector mechanism.

44. The combination harness apparatus and head-mounted display device according to embodiments 27-43, wherein the tongue is mechanically biased into the locked position, with a leading edge of the catch being angled away from the lip of the strap connector mechanism, such that as the strap connector mechanism is inserted into the slot, the lip of the strap connector mechanism slides along the leading edge of the catch and causes the tongue to flex downwardly until the lip passes completely over the catch, at which point the tongue automatically moves back into the locked position and causes the catch to hook onto the lip.

45. The combination harness apparatus and head-mounted display device according to embodiments 27-44, wherein each strap connector mechanism provides a thumb tab for assisting with manually moving the strap connector mechanism between the engaged state and disengaged state.

46. The combination harness apparatus and head-mounted display device according to embodiments 27-45, further comprising: an at least one further display connector portion positioned on a top surface of the display device; and the harness assembly further comprising: an at least one elongate secondary head strap positioned and configured for extending in a substantially vertical plane over a top of the user's head, with a terminal end of the secondary head strap being positioned proximal a forehead of the user; and an at least one strap connector portion configured for removable engagement with the at least one further display connector portion, each of the at least one strap connector portion engaged with a corresponding one of the terminal ends of the at least one secondary head strap.

47. The combination harness apparatus and head-mounted display device according to embodiments 27-46, wherein the at least one secondary head strap is lengthwise adjustable.

48. The combination harness apparatus and head-mounted display device according to embodiments 27-47, wherein an opposing end of the at least one secondary head strap is engaged with the at least one primary head strap, at a location proximal a rear of the user's head.

49. The combination harness apparatus and head-mounted display device according to embodiments 27-48, wherein the harness assembly further comprises a headpiece sized and configured for being removably engaged with the user's head, with each of the at least one primary head strap and at least one secondary head strap being engaged with the headpiece and configured for cooperating to securely engage the harness assembly with the user's head.

50. The combination harness apparatus and head-mounted display device according to embodiments 27-49, wherein the at least one primary head strap cooperates with the headpiece to extend around the rear of the user's head.

51. The combination harness apparatus and head-mounted display device according to embodiments 27-50, wherein an opposing end of the at least one secondary head strap is engaged with the headpiece.

In closing, regarding the exemplary embodiments of the present invention as shown and described herein, it will be appreciated that a harness apparatus for head-mounted display devices is disclosed and configured for enabling fast and secure engagement and disengagement of said display devices. Because the principles of the invention may be practiced in a number of configurations beyond those shown and described, it is to be understood that the invention is not in any way limited by the exemplary embodiments, but is generally directed to a harness apparatus for head-mounted display devices and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims.

The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that the methods and the order in which the respective elements of each method are performed are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A harness apparatus for use with a head-mounted display device and configured for removable engagement with a head of a user, the apparatus comprising: a pair of display connector portions positioned on opposing left and right sides of the display device, each of the display connector portions comprising: a connector plate; a bottom surface of the connector plate configured for engagement with a mount location on the corresponding left or right side of the display device; and an opposing top surface of the connector plate providing a display connector mechanism configured as a slot; and a harness assembly comprising: an at least one elongate primary head strap extending in a substantially horizontal plane for engagement about the user's head, with opposing terminal ends of the at least one primary head strap being positioned proximal a left temple and a right temple, respectively, of the user's head; a pair of strap connector portions engaged with a corresponding one of the terminal ends of the at least one primary head strap; each of the strap connector portions providing a strap connector mechanism configured as a pair of spaced apart connector tabs capable of selectively flexing inwardly toward one another as the connector tabs are inserted into the slot of the corresponding display connector mechanism, with a terminal end of each connector tab being configured for indexing into a corresponding connector notch positioned within the slot of the corresponding display connector mechanism; and a gasket sized for approximating the dimensions of a perimeter edge of a housing of the display device, the gasket extending between the strap connector portions and configured for being positionable in contact with a face of the user so as to be sandwiched between the display device and the user's face when the display device is engaged with the harness assembly; whereby, with the gasket positioned in contact with the user's face, the primary head strap may be secured around the user's head, thereby maintaining the positioning of the gasket relative to the user's face, and allowing the display device to be quickly engaged and subsequently disengaged with the harness assembly via the corresponding display connector portions.

2. The harness apparatus of claim 1, wherein each of the strap connector portions provides a strap aperture sized and configured for allowing the corresponding terminal end of the at least one primary head strap to pass therethrough.

3. The harness apparatus of claim 1, wherein the strap connector portions are mounted to opposing lateral edges of the gasket.

4. The harness apparatus of claim 1, wherein engagement between each strap connector mechanism and the corresponding display connector mechanism is oriented at an engagement angle that is between approximately 0 degrees and approximately 90 degrees relative to the user's face.

5. The harness apparatus of claim 4, wherein the engagement angle is approximately 90 degrees relative to the user's face.

6. The harness apparatus of claim 1, wherein each display connector mechanism provides a lock configured for selectively preventing the strap connector mechanism from becoming unintentionally disengaged from the display connector mechanism.

7. The harness apparatus of claim 6, whereby each strap connector mechanism is configured for moving between one of an engaged state—wherein the terminal ends of the connector tabs are indexed into the corresponding connector notches—and a disengaged state—wherein the terminal ends of the connector tabs are moved out of the corresponding connector notches, thereby allowing the strap connector mechanism to be disengaged from the display connector mechanism.

8. The harness apparatus of claim 7, wherein the lock of the display connector mechanism is a stop block slidably positioned within the slot and configured for selectively moving between one of a locked position—wherein the stop block is moved into a position substantially between the connector tabs, when the strap connector mechanism is in the engaged state, so as to physically prevent the connector tabs from flexing inwardly toward each other which, in turn, prevents the terminal ends of the connector tabs from moving out of the corresponding connector notches—and an unlocked position—wherein the stop block is moved into a position that no longer prevents the connector tabs from flexing inwardly toward each other which, in turn, allows the terminal ends of the connector tabs to selectively move out of the corresponding connector notches.

9. The harness apparatus of claim 8, wherein the stop block is mechanically biased into the locked position, such that as the connector tabs are inserted into the slot, the terminal ends of the connector tabs push the stop block into the unlocked position until the terminal ends index into the corresponding connector notches, at which point, the stop block automatically moves back into the locked position.

10. The harness apparatus of claim 1, further comprising:
an at least one further display connector portion positioned on a top surface of the display device; and
the harness assembly further comprising:
an at least one elongate secondary head strap positioned and configured for extending in a substantially vertical plane over a top of the user's head, with a terminal end of the secondary head strap being positioned proximal a forehead of the user; and
an at least one strap connector portion configured for removable engagement with the at least one further display connector portion, each of the at least one strap connector portion engaged with a corresponding one of the terminal ends of the at least one secondary head strap.

11. The harness apparatus of claim 10, wherein an opposing end of the at least one secondary head strap is engaged with the at least one primary head strap, at a location proximal a rear of the user's head.

12. The harness apparatus of claim 10, wherein the harness assembly further comprises a headpiece sized and configured for being removably engaged with the user's head, with each of the at least one primary head strap and at least one secondary head strap being engaged with the headpiece and configured for cooperating to securely engage the harness assembly with the user's head.

13. The harness apparatus of claim 12, wherein the at least one primary head strap cooperates with the headpiece to extend around the rear of the user's head.

14. The harness apparatus of claim 12, wherein an opposing end of the at least one secondary head strap is engaged with the headpiece.

15. A harness apparatus for use with a head-mounted display device and configured for removable engagement with a head of a user, the apparatus comprising: a pair of display connector portions positioned on opposing left and right sides of the display device, each of the display connector portions comprising: a connector plate; a bottom surface of the connector plate configured for engagement with a mount location on the corresponding left or right side of the display device; and an opposing top surface of the connector plate providing a display connector mechanism configured as a slot; and a harness assembly comprising: an at least one elongate primary head strap extending in a substantially horizontal plane for engagement about the user's head, with opposing terminal ends of the at least one primary head strap being positioned proximal a left temple and a right temple, respectively, of the user's head; a pair of strap connector portions engaged with a corresponding one of the terminal ends of the at least one primary head strap, wherein engagement between each strap connector portion and the corresponding display connector portion is oriented at an engagement angle that is between approximately 0 degrees and approximately 90 degrees relative to the user's face; each of the strap connector portions providing a strap connector mechanism configured as a pair of spaced apart connector tabs capable of selectively flexing inwardly toward one another as the connector tabs are inserted into the slot of the corresponding display connector mechanism, with a terminal end of each connector tab being configured for indexing into a corresponding connector notch positioned within the slot of the corresponding display connector mechanism; and a gasket sized for approximating the dimensions of a perimeter edge of a housing of the display device, the gasket extending between the strap connector portions and configured for being positionable in contact with a face of the user so as to be sandwiched between the display device and the user's face when the display device is engaged with the harness assembly; whereby, with the gasket positioned in contact with the user's face, the primary head strap may be secured around the user's head, thereby maintaining the positioning of the gasket relative to the user's face, and allowing the display device to be quickly engaged and subsequently disengaged with the harness assembly via the corresponding display connector portions.

16. A combination harness apparatus and head-mounted display device configured for removable engagement with a head of a user, the apparatus comprising: a head-mounted display device; a pair of display connector portions positioned on opposing left and right sides of the display device, each of the display connector portions comprising: a connector plate; a bottom surface of the connector plate configured for engagement with a mount location on the corresponding left or right side of the display device; and an opposing top surface of the connector plate providing a display connector mechanism configured as a slot; and a harness assembly comprising: an at least one elongate primary head strap extending in a substantially horizontal plane for engagement about the user's head, with opposing terminal ends of the at least one primary head strap being positioned proximal a left temple and a right temple, respectively, of the user's head; a pair of strap connector portions engaged with a corresponding one of the terminal ends of the at least one primary head strap; each of the strap connector portions providing a strap connector mechanism configured as a pair of spaced apart connector tabs capable of selectively flexing inwardly toward one another as the connector tabs are inserted into the slot of the corresponding display connector mechanism, with a terminal end of each connector tab being configured for indexing into a corresponding connector notch positioned within the slot of the corresponding display connector mechanism; and a gasket sized for approximating the dimensions of a perimeter edge of a housing of the display device, the gasket extending between the strap connector portions and configured for being positionable in contact with a face of the user so as to be sandwiched between the display device and the user's face when the display device is engaged with the harness assembly; whereby, with the gasket positioned in contact with the user's face, the primary head strap may be secured around the user's head, thereby maintaining the positioning of the gasket relative to the user's face, and allowing the display device to be quickly engaged and subsequently disengaged with the harness assembly via the corresponding display connector portions.

* * * * *